United States Patent [19]

Carlson et al.

[11] Patent Number: 4,976,396
[45] Date of Patent: Dec. 11, 1990

[54] AIRCRAFT CONFIGURATION WITH AFT MOUNTED ENGINES

[75] Inventors: Robert B. Carlson, Tukwila; Barbara J. Cosgrove, Kirkland; Paul T. Meredith, Renton, all of Wash.

[73] Assignee: The Boeing Company, Seattle, Wash.

[21] Appl. No.: 120,637

[22] Filed: Nov. 13, 1987

[51] Int. Cl.5 .............................................. B64C 1/16
[52] U.S. Cl. .................................... 244/55; 244/119; 244/131
[58] Field of Search ...................... 244/119, 13, 55, 15, 244/121, 131

[56] References Cited

U.S. PATENT DOCUMENTS

| | | | |
|---|---|---|---|
| 2,863,620 | 12/1958 | Vautier | 244/55 |
| 3,388,878 | 6/1968 | Peterson et al. | 244/55 |
| 4,311,289 | 1/1982 | Finch | 244/55 |
| 4,417,708 | 11/1983 | Negri | 244/119 |
| 4,447,022 | 5/1984 | Lion | 244/45 R |
| 4,629,147 | 12/1986 | Johnson, Jr. et al. | 244/55 |
| 4,674,712 | 6/1987 | Whitener et al. | 244/119 |
| 4,712,751 | 12/1987 | Hirschel | 244/119 |

FOREIGN PATENT DOCUMENTS 2177989  2/1987  United Kingdom ............... 244/119

Primary Examiner—Galen Barefoot
Attorney, Agent, or Firm—Hughes & Multer

[57] ABSTRACT

An aircraft having two aft mounted prop engines on opposite sides of the fuselage. The side surfaces of the fuselage adjacent to the propellers are contoured so that each has an inwardly and rearwarding slanting forward region, a substantially longitudinally aligned intermediate region which is adjacent to the propellers, and a rear region which slants inwardly and rearwardly to an end closure location. This configuration results in a more uniform flow pattern into the propellers.

41 Claims, 10 Drawing Sheets

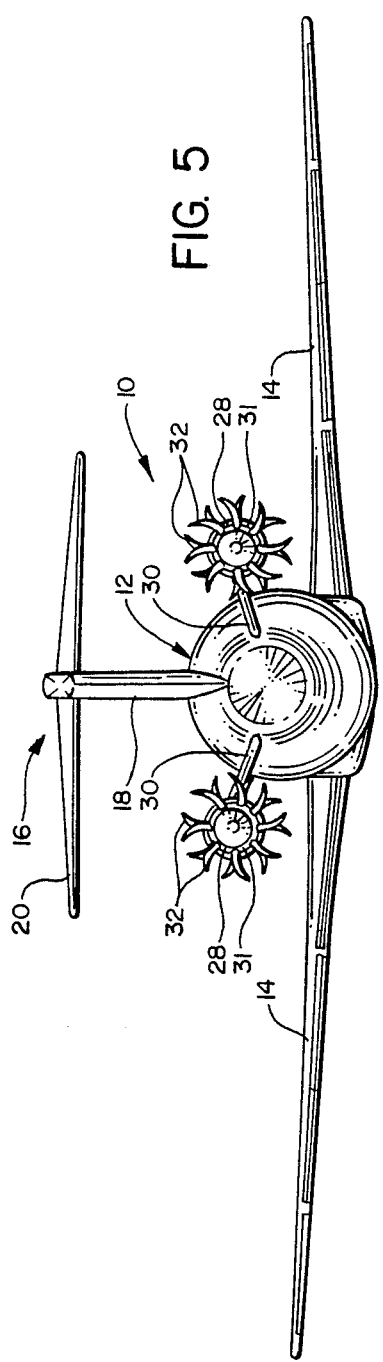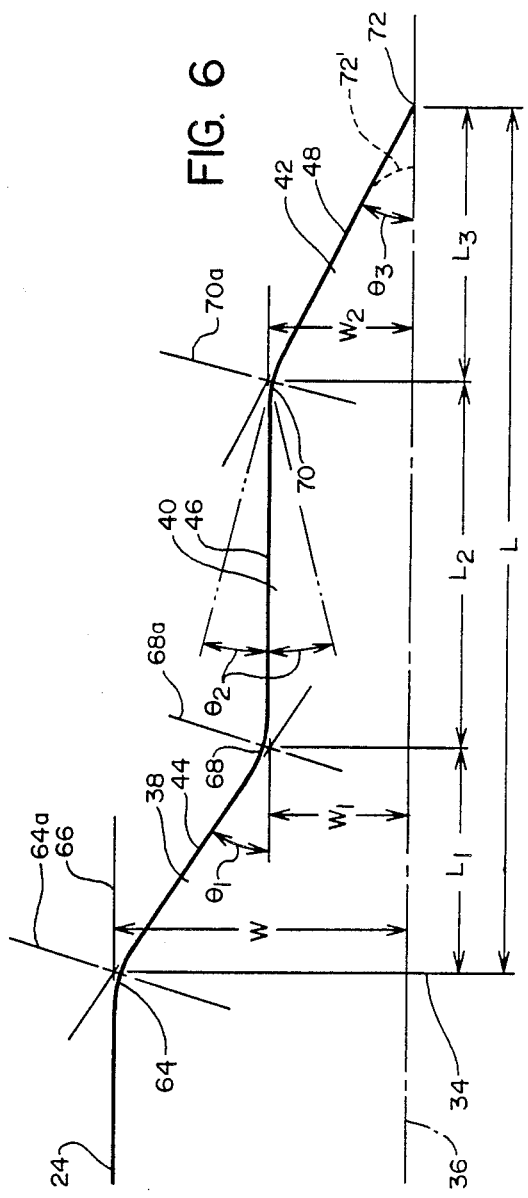

4,976,396

AIRCRAFT CONFIGURATION WITH AFT MOUNTED ENGINES

BACKGROUND OF THE INVENTION

1. Field of the Invention

The present invention relates to an aircraft configuration, and more particularly to an aircraft configuration where propellers are mounted adjacent to the fuselage of the aircraft.

2. Background Art

There are a number of design considerations or tradeoffs relating to the location and mounting of aircraft engines. With regard to engines having propellers, generally, for a given horsepower engine, the diameter of the propeller is greater than the diameter of a jet engine. A further consideration is that in a jet engine, such as a fan jet engine, the fan is enclosed in a nacelle or shroud which helps to straighten the flow into the fan. On the other hand, with the propeller not being so enclosed, it is somewhat more sensitive to the direction of the path of the air flowing through the propeller area. For these reasons, as well as others, it is important to consider not only the location of the propellers relative to the other components of the airplane, but also the configuration of the major components of the airplane as these relate to the operation and performance of the propellers.

A search of the patent literature has disclosed a number of U.S. Patents, these being the following.

U.S. Pat. No. 1,386,493 discloses an aircraft or dirigible having a cooling system for a motor that drives the propeller. Air is introduced into the nacelle and this passes over the radiator of the motor. The air then passes rearwardly out from the nacelle. For example, in FIG. 1 air is introduced through aperture "a" and into chamber "c" enclosing motor "d". The air then flows along passage "e" and exits through the aperture "f". Also, air is inducted through the aperture "h", passes across the radiator "i" and is expelled through the aperture "j". In FIG. 1, the propeller is mounted at the rear of the aircraft. Other configurations show the propeller mounted at the forward end of the aircraft.

U.S. Pat. No. 2,385,499—Garvy discloses an aircraft having a propeller positioned at the forward end of the fuselage. The rear end of the fuselage has lateral portions which bulge outwardly. As shown in FIG. 7, when the airplane is turning so as to be in a yaw condition, the air flowing over the rearwardly positioned bulging portions on the fuselage acts in a manner to create a pressure differential along the opposite sides of the rear portion of the airplane, thus making it easier to turn the airplane.

U.S. Pat. No. 2,874,922—Whitcomb deals with the overall shaping of the airplane to reduce the effects of drag when the airplane approaches and exceeds the speed of sound. This relates to the well-known "area ruling" concept.

U.S. Pat. No. 2,956,760—Attinello discloses an airplane where the side portions of the fuselage have the capability of blowing air outwardly or sucking air inwardly. This is done to affect the local pressure along the fuselage, thus obtaining some of the aerodynamic benefits which might otherwise be obtained by modifying the actual contour of the fuselage.

U.S. Design Pat. No. 211,426—Smith discloses an aircraft configuration where the propeller is mounted rearwardly of the wing and is centered on the fuselage. At the location of the propeller, the diameter of the fuselage is made smaller than that of the main portion of the fuselage.

U.S. Pat. No. 3,455,523—Hertel discloses an aircraft where a cantilever support 2 is affixed to the rear end 7 of the fuselage 9. A plurality of jet engines are mounted to this cantilevered support member 2. This patent points out the difficulty of prior art configurations where the engines are mounted under the wing or laterally of the fuselage, in that the streams of air flowing along the engine and along the aircraft part on which they are mounted interfere with each other and cause an increased resistance and drag. The patent in column 1, beginning on line 64, discusses the invention disclosed therein as follows, "Due to the fact that the engines are carried by a rearwardly projecting spear-like support spaced from the fuselage, detrimental effects of the engine on the fuselage are avoided, and neither interference of airstreams, nor impingement of the walls of the fuselage by high pressure sonic waves takes place."

U.S. Pat. No. 3,476,336—Hertel relates to the contouring of a body, such as a fuselage of an aircraft, traveling at high subsonic speeds. The body has a transverse thickness gradually increasing from the nose of the body to an intermediate portion and gradually decreasing from the intermediate portion to the tail of the body. In FIGS. 15, 16 and 17, there is shown an arrangement somewhat similar to the earlier Hertel patent (U.S. Pat. No. 3,455,523), where a plurality of jet engines are mounted to a thin support 51 extending rearwardly from the fuselage.

SUMMARY OF THE INVENTION

The aircraft of the present invention comprises a fuselage having a longitudinal center axis, a forward portion, an intermediate main portion, and a rear portion. The rear portion comprises a forward section, a rear section with an end closure location, and an intermediate section.

There are first and second engines mounted adjacent to an exterior surface of said rear section. The engines have first and second propeller means at first and second propeller locations. The propeller means are arranged to rotate about first and second propeller axes, respectively, with each propeller axis having a substantial alignment component parallel to said longitudinal axis.

The rear portion of the fuselage has first and second exterior, longitudinally extending surface portions. The first surface portion has a first forward surface region extending longitudinally along said forward section, a second intermediate surface region extending along said intermediate section adjacent to the first propeller means, and a rear surface region extending along the rear section. The second surface portion has second forward, intermediate and rear surface regions disposed along the first, second and rear sections.

The rear fuselage portion is characterized in that the forward region of each surface portion slants rearwardly and inwardly toward the longitudinal center axis at a relatively greater inward and rearward slant relative to the longitudinal axis and curves concavely to join its related intermediate region. The intermediate region has less inward and rearward slant with respect to the longitudinal center axis relative to the related forward surface region. Each intermediate region joins to its related rear region in a convex curve with each rear region slanting rearwardly and inwardly to said closure location.

The first and second longitudinally extending surface portions each have a generally longitudinally extending surface center line, with forward, intermediate and rear center line portions. Each forward center line portion is slanted forwardly and outwardly at a forward angle which is between about 5 and 30 degrees, preferably between about 5 and 20 degrees, and in the preferred form between about 12 to 13 degrees.

Each intermediate center line portion is angled in a forward direction at an intermediate angle between −15 degrees and +15 degrees, with a minus angle slanting forwardly and toward the longitudinal axis, and a positive angle slanting forwardly and away from said longitudinal axis. A more preferred range is between about −5 and +5 degrees, with the preferred value being 0 degrees.

Each rear surface center line portion slants forwardly and outwardly at a rear angle of between about 5 and 30 degrees, more preferably between about 5 and 20 degrees, with a preferred range being about 16 to 17 degrees.

The rear fuselage portion has an overall length dimension, and the forward, rear and intermediate sections have forward, rear and intermediate length dimensions, respectively. There is a forward length dimension ratio which is a ratio of the forward length dimension to the overall length dimension, and this is broadly between about 0.1 and 0.8, with a preferred range being between about 0.2 and 0.6, and with a more preferred range being between about 0.27 and 0.37. There is also an intermediate length ratio which is the ratio between the intermediate length and the overall length, this being broadly between about 0.1 and 8, with a preferred range being between about 0.2 and 0.6, and with the more preferred range being between about 0.23 and 0.3. There is also a rear length dimension ratio which is broadly between about 0.1 and 0.8, with a preferred range being between about 0.2 and 0.6, and with the more preferred range being between about 0.4 and 0.45.

There is also a surface width dimension which is equal to a distance measured from a point on a center line of one of said surface portions along a transverse line generally perpendicular to a transverse tangent line at the point on the center line to a vertical longitudinal center plane along the fuselage. The intermediate portion of the fuselage has at a rear portion thereof a total surface width dimension which is twice the surface width dimension at the location of the rear portion of the intermediate fuselage portion. The aircraft has a length to surface width ratio which is the ratio of the aft fuselage portion length to the total surface width dimension and which is between about 1 and 4. A preferred range is between about 2 to 3, and a more preferred range is between about 2.5 and 2.6.

The aircraft also has a surface width dimension ratio which is the ratio of the surface width dimensions at the forward and rear ends of the intermediate surface region, to a value equal to twice the surface width dimension at a rear end portion of the intermediate fuselage portion. This surface width dimension ratio is broadly between about 0.4 and 0.9, preferably between about 0.5 and 0.8, and more preferably between about 0.6 and 0.65.

The aircraft has a diameter dimension of an equivalent circle of a cross sectional area of the fuselage. There is a first diameter dimension ratio which is equal to a ratio of the diameter dimension at a forward end of the intermediate section to a diameter dimension at a rear end portion of the intermediate fuselage portion. The first diameter dimension ratio is between about 0.4 and 0.9, with a preferred range being between about 0.5 and 0.8, and with a more preferred range being between about 0.6 and 0.65. There is a second diameter dimension ratio which is equal to a ratio between the diameter dimension at a rear end of the intermediate section to the diameter dimension at a rear end portion of the intermediate portion of the fuselage. This second diameter dimension ratio is between about 0.3 and 1, with a preferred range being between about 0.4 and 0.9, and a more preferred range being between about 0.6 and 0.65.

Further, the intermediate section has a relative diameter dimension ratio which is equal to a ratio between a diameter dimension at a forward end of the intermediate section and a diameter dimension at a rear end of the intermediate section, this ratio being between about 0.8 and 1.2, with a preferred ratio being approximately 1.

The fuselage has associated propeller flow fields extending forwardly and rearwardly from propeller locations of said propeller means. The propeller flow fields are characterized in having Uniformity Parameters along the flow fields under circumstances where the propeller means are absent from the propeller locations. The fuselage rear portion is characterized in that the fuselage affects the propeller flow fields in a manner that the Uniformity Parameters vary in a rearward direction along the propeller flow fields in that there are first Uniformity Parameters of a higher Uniformity Parameter value forward of the propeller locations. Second Uniformity Parameters are at the propeller locations and these have lower Uniformity Parameter values in comparison with the first Uniformity Parameter values. There are third Uniformity Parameter values at locations rearwardly of the propeller locations of the third higher Uniformity Parameter values in comparison with the second Uniformity Parameter values.

Each of the first Uniformity Parameter values is between about 0 and 15, with a preferred range being between about 2 to 5, and with a more preferred range being between about 3.5 and 4.5. The third Uniformity Parameter values are broadly between about 0 and 15, with a preferred range being between about 2 and 5, and with the more preferred range being between about 2.5 and 3.5. The second Uniformity Parameter values are broadly between about 0 and 5, with a preferred range being between about 0 and 2, and in the preferred configuration described herein between about 0 and 1.5.

The fuselage has a total fuselage length, and there is a ratio of the overall rear fuselage length to the total fuselage length. This ratio is broadly between about 0.15 and 0.45, with a preferred range being between about 0.2 and 0.4, and in the preferred form between about 0.27 and 0.35.

Within the broader aspects of the present invention, a single engine with a propeller can be placed adjacent to a body, with the body being contoured in accordance with the teachings of the present invention. Other features of the present invention will become apparent from the following detailed description.

BRIEF DESCRIPTION OF THE DRAWINGS

FIG. 5 is a rear elevational view thereof;

FIG. 6 is a schematic view of the side surface of the rear portion of the fuselage of the present invention, to illustrate certain configuration characteristics thereof;

BRIEF DESCRIPTION OF THE PREFERRED EMBODIMENT

Figure 1:
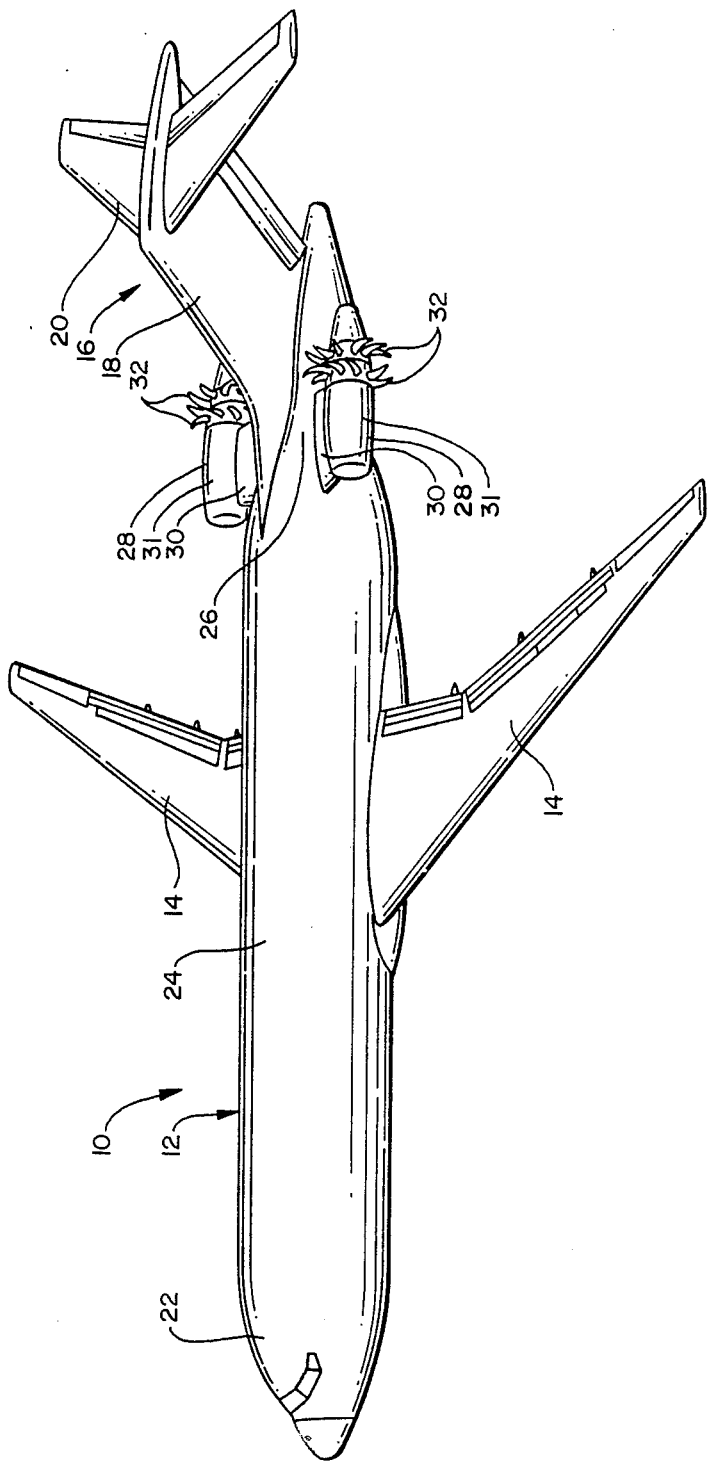
FIG. 1 is an isometric view looking downwardly toward one side of the airplane of the present invention.

It is believed that a clearer understanding of the present invention will be obtained by first discussing generally some problems which can arise from mounting a prop engine to an aft portion of an aircraft fuselage. The aft body of a typical aircraft tapers smoothly in cross-section, thus causing the surrounding flow field at the rear of the fuselage to be curved. If a propeller is placed in this curved flow field in a manner that the axis of rotation of the propeller is aligned with the longitudinal axis of the fuselage, the curved flow field appears to the rotating propeller or fan as an oscillation in the blade angle of attack which varies radially and circumferentially in the plane of rotation. This causes similar oscillations in blade loading which can result in propeller or fan vibration and a loss of propulsive efficiency. To alleviate this, the installation of a propeller or fan is normally optimized by aligning the rotation axis with the local flow field as much as possible, and by selecting blade pitch and twist to account for the forward and rotational speeds of the blade. However, this is not a totally adequate solution, since the blade element angle of attack due to the curved flow field varies radially and circumferentially in the plane of rotation. The present invention was conceived to alleviate this problem. There will first be a presentation of the main components and overall configuration of the aircraft of the present invention, and then a more detailed analysis of the operation of the aircraft of the present invention and the details of the configuration.

The airplane 10 of the present invention comprises a fuselage 12, a pair of wings 14 and a tail assembly 16 which is made up of a vertical fin 18 and a horizontal stabilizer 20. For purposes of description, the fuselage can be considered as having a forward portion 22, a main intermediate portion 24 and a rear portion 26. A pair of turboprop engines 28 are mounted by means of struts 30 on opposite sides of the rear portion 26 of the fuselage 12. Each engine 28 comprises a nacelle 31 and a pair of propellers 32.

The present invention is concerned primarily with the configuration of the rear fuselage portion 26 relative to the placement and operation of the engines 28, and more particularly the placement and operation of the propellers 32 of the engines 28. The forward and intermediate fuselage portions 24 and 26, the wings 14 and the tail assembly 16 are, or may be, in and of themselves conventional. Further, the turboprop engines 28, with regard to their basic configuration, construction and operation, are or may be conventional.

Figure 2:
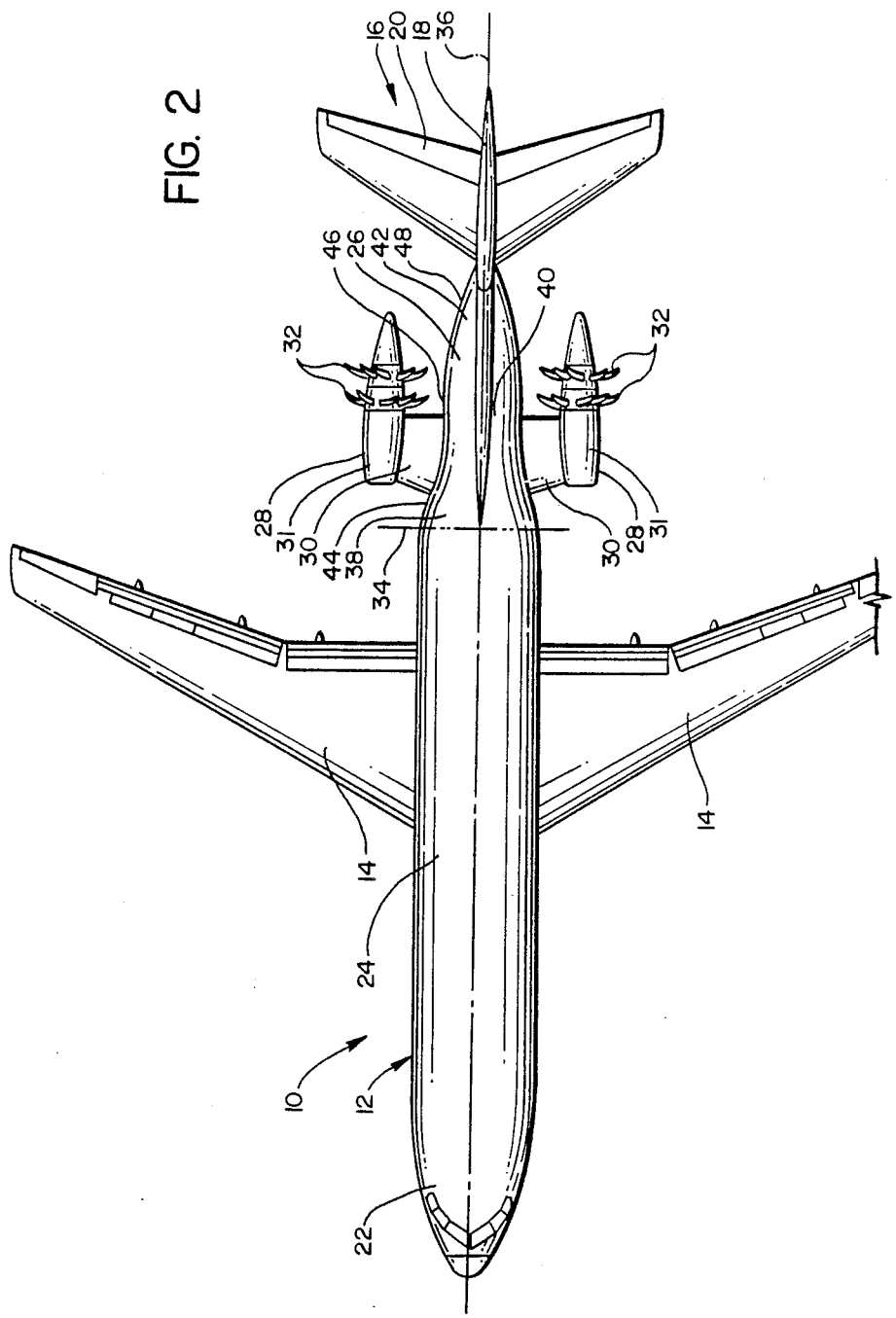
FIG. 2 is a top plan view thereof.

The intermediate main portion 24 of the fuselage 12 is, as shown herein, of a substantially uniform circular cross-sectional configuration, and for purposes of description can be considered as ending at a rear transition plane indicated at 34 in FIGS. 2 and 6 at the location of a "break point" (to be defined hereinafter) where the fuselage 12 begins to taper inwardly toward a longitudinal center axis 36 of the fuselage toward a closure. For purposes of description, the fuselage rear portion 26 can be considered as having a forward section 38, an intermediate section 40 and a rear section 42. In general, the objectives of the present invention are obtained by making the intermediate section 40 of the rear fuselage portion 26 substantially "non-closing" in the vicinity of the propellers 32. This will be explained more fully below.

The forward section 38 has two forward side surface regions 44 which slant inwardly and rearwardly. The intermediate section 40 has two intermediate side surface regions 46 which extend substantially parallel to the longitudinal center axis 36. The rear section 42 of the fuselage rear portions 26 has two side surface regions 48 which curve convexly toward a closure location 50. To define the side surface regions 44-48, it is first necessary to define the "most adjacent surface location" which is that point on the intermediate surface region 46 which is closest to the outermost path portion followed by the outermost tip portion of the adjacent propeller 32, with the distance from the outermost path portion of the propeller 32 to the fuselage surface being measured along a line which passes through the center axis of rotation of the propeller 32 and is perpendicular to the surface region 46 at the point where the line enters the surface region 46.

Figure 7:
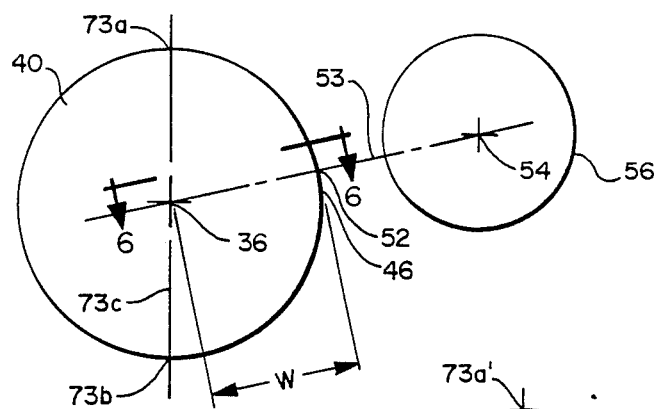
FIG. 7 is a semi-schematic sectional view taken transverse to the longitudinal axis of the fuselage at line 7-7 of FIG. 6, this figure showing certain dimensional relationships disclosed in FIG. 6.
Figure 8:
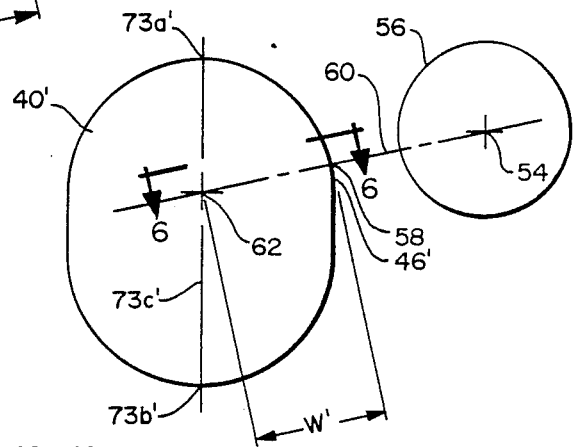
FIG. 8 is a semi-schematic sectional view taken of the same location as FIG. 7, and is to furter illustrate the relationships shown in FIG. 6.

Thus, with reference to FIG. 7, there is shown the cross sectional configuration of the intermediate section 40 of the rear fuselage portion 26 with this being a circular configuration. In this instance, the most adjacent surface location, indicated at 52, is along a line 53 extending from the center axis of rotation 54 of the propeller 32 (the outermost propeller path portion being shownat 56) to the longitudinal center axis 36 of the fuselage 12, which is in this instance also the longitudinal center axis of the intermediate section 40. The line 53 is perpendicular to the fuselage surface at the location 52. With reference to FIG. 8, there is shown a modified cross sectional configuration of the intermediate section 40 of the rear fuselage portion 26, where the intermediate side surface regions 46 are more planar in a vertical direction, with the intermediate side surface regions being indicated at 46'. In this instance, the distance is measured from the center axis of rotation 54 through the outermost edge 56 of the path of the propeller 32 to a point 58 on the intermediate side surface region 46'. In this particular instance, the line 60 along which the distance is measured is at a location further upward in comparison with the distance line shown in FIG. 7, and passes through an axis 62 located relatively farther upwardly in the intermediate fuselage section 40' of the rear fuselage portion 26.

With the "most adjacent surface location" defined, we can now proceed with a definition of the side surface regions 44–48. The side surface regions 44–48 lie along a side surface center line which passes through the "most adjacent surface location" and extends forwardly and rearwardly therefrom along a path parallel to the stream tube which passes through the related propeller set 32. In the following discussion, for purposes of analysis, this stream tube of each propeller set 32 will be considered as having a constant cross sectional configuration, and being centered on the stream line which extends forwardly of that propeller set 32 and is centered on the propeller center axis 54, and also extends rearwardly from the location of the propeller 32 under flow conditions along the rear fuselage portion 42 when no propeller is present. In the configuration of the present invention, this propeller stream tube will slant in an inward and rearward direction in the vicinity of the forward side surface region 44, travel in a path which is more in alignment with the fuselage longitudinal axis 36 in the area of the intermediate side surface region 46, and then slant inwardly and rearwardly along the rear surface region 48. In the preferred configuration of the present invention, the two engines 28 do not extend directly laterally from the fuselage rear portion 26, but are mounted with the center axis of each engine 28 being positioned somewhat higher than the longitudinal center axis 36 of the fuselage 12.

In the preferred configuration shown in FIGS. 1 through 5, the main intermediate fuselage portion 24 has a circular cross sectional configuration. The three sections 38, 40 and 42 of the rear fuselage portion 26 each have, at cross sectional locations along the longitudinal axis 36, substantially circular cross sectional configurations. The circular cross sectional configuration of the forward section 38 tapers radially inwardly in a rearward direction in the form of a frusto-conical surface; the circular configuration of the intermediate section 40 has a substantially constant cross sectional circular configuration; and the circular cross sectional configuration of the rear section 42 tapers radially inwardly in a rearward direction.

Figure 3:
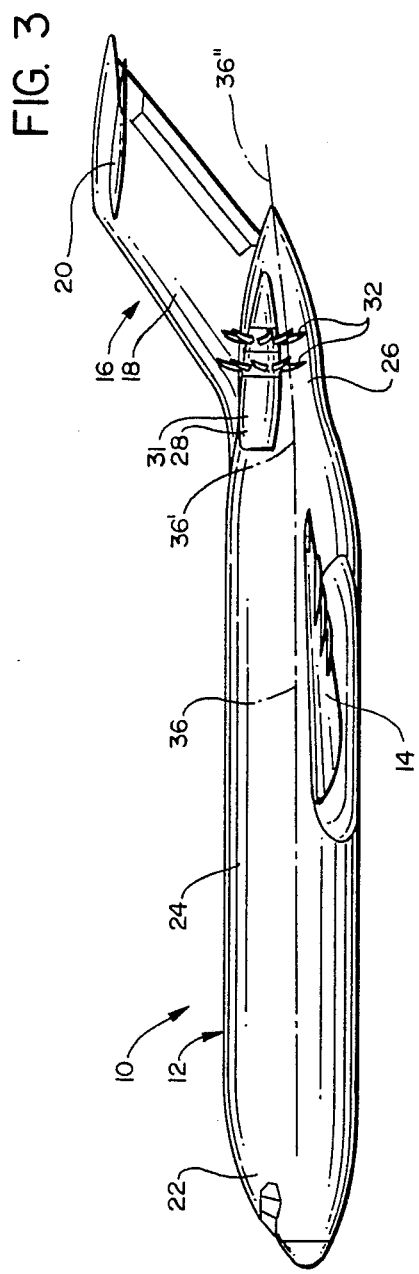
FIG. 3 is a side elevational view thereof.
Figure 4:
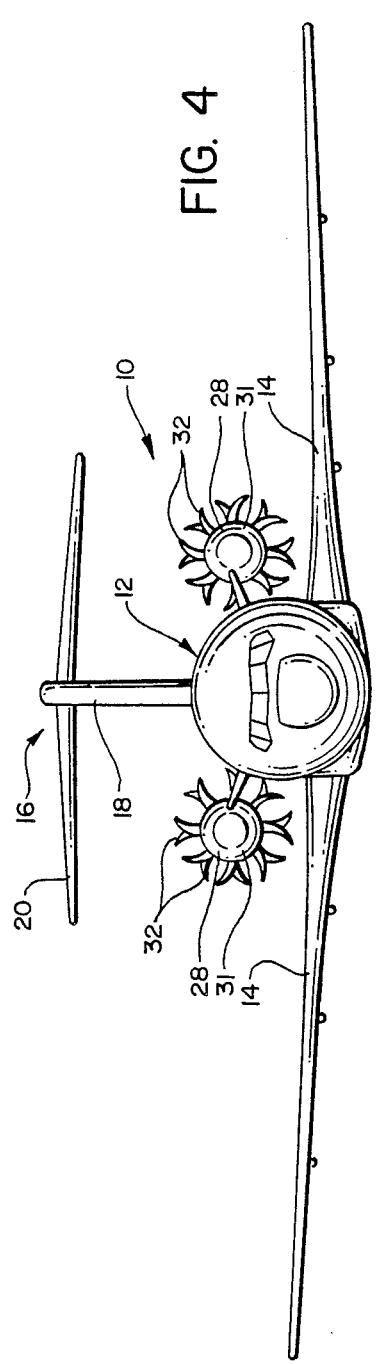
FIG. 4 is a front elevational view thereof.

It will also be noted that the longitudinal center axis 36 shifts moderately upwardly from the main fuselage section 24 to the rear fuselage section 26. Thus, as can be seen in FIG. 3, the longitudinal axis 36, which is at the center of the circular cross sectional configuration of the fuselage section 24 is positioned below that portion of the longitudinal axis indicated at 36' which extends through the intermediate section 40 of the rear fuselage portion 26. Also, it will be noted that the rearmost portion of the longitudinal axis (indicated at 36") in the rear section 42 of the rear fuselage portion 26 has a moderate upward and rearward slant so as to follow the center locations of the various circular cross sections along the length of the rear section 42.

To define the configuration of the two side surface regions 44–48, reference is made to FIG. 6, which shows one set of the side surface regions 44–48. The "break points" which indicate the end limits of the regions 44–48 are the points where a line bisecting the angle formed by the side surface center line portions of the adjacent forward and rear side surface regions at the juncture point of those side surface center line portions meet passes through the fuselage surface. Thus, the forward break point 64 is that location where the line 64a intersects the surface of the fuselage 12, with the line 64a bisecting the angle formed by the surface region center line at the forward surface region 44 and the line 66 which lies in the plane of the main intermediate section 24 and meets the center line of the forward surface region 44. A second break point 68 is located at the point of intersection of the line 68a with the surface of the fuselage, with the line 68a bisecting the angle which is formed by the side surface center line at the forward surface region 44 and the side surface region center line at the intermediate surface region 46. The third break point 70 is at the point where the line 70a intersects with the surface of the fuselage 12, with the line 70a bisecting the angle formed by the region center line of the intermediate side surface region 46 and the region center line of the aft side surface region 48. Thus, the forward surface region 44 extends between the break points 64 and 68; the intermediate surface region 46 extends between the break points 68 and 70; and the aft side surface region 48 extends from the break point 70 to the idealized rear end portion 72 of the rear surface region 48.

For purposes of analysis of the contour of the surface regions 44–48, and for determining relative dimensions and configuration relationships, the side surface center line portion of the rear side surface region 48 shall be considered as continuing in a substantially straight line to an idealized end location 72 which intersects the longitudinal axis 36. In actuality, the true configuration of the fuselage is rounded moderately at its extreme end portion as indicated at 72'. The length of each of the surface regions 44–48 shall be measured along a line parallel to the longitudinal center axis 36, with the length of the forward surface region 44 being indicated in FIG. 6 at the $L_1$, the length of the intermediate surface region 46 being indicated at $L_2$, and the length of the rear surface region 48 being indicated at $L_3$. With regard to the angular alignment of the three side surface regions 44–48, the angle of alignment shall be considered as being equal to the angle which the side surface region center lines make with a line parallel with the longitudinal axis 36. For purposes of analysis of these angles of alignment, the longitudinal axis 36 shall be considered as having no angular deviations through the aft fuselage portion 26. In FIG. 6, the angular alignment of the forward surface region 44 is indicated at $\theta_1$; the angular alignment of the intermediate surface region 46 is indicated at $\theta_2$; and the angular alignment of the aft surface region 48 as indicated at $\theta_3$. It is to be recognized that in the somewhat idealized arrangment shown in FIG. 6, the main portions of the side surface center lines of the side surface regions 44–48 are shown as being straight lines. It is possible that these side surface center lines could be moderately curved. For example, the side surface lines of the aft region 48 could be curved somewhat in the configuration of an ogive. In those circumstances where there is some moderate curvature of the side surface center lines, the alignment of the side surface center line shall be considered as approximating the overall direction of that side surface center center line portion.

With regard to the width dimensions of the side surface regions 44–48, the contouring is more critical in the area closely adjacent to the side surface center lines of the regions 44–48, and somewhat less significant as the surface area approaches the crown line at the uppermost and lowermost points of the fuselage. It has been found that since the flow field passing into the propellers 32 is affected by the flow field entirely around the fuselage, that the most benefit of the present invention can be obtained by contouring the fuselage aft portion 26 in accordance with the teachings of the present invention entirely around the fuselage aft section 26. Thus, in a broad sense, each side surface region 44–48 would extend from an upper fuselage crown line to a lower fuselage crown line. In a narrower sense, the more significant side surface regions would extend approximately half way from the side surface center line to the upper and lower crown lines. The upper and lower crown lines are illustrated at 73a and 73b in FIG. 7 and at 73a' and 73b' in FIG. 8.

Another set of significant configuration limitations are the width relationships. There is a surface width dimension W which is the distance between the most adjacent surface location along a line transverse to the longitudinal center axis 36 to the location of a longitudinally and vertically aligned plane which coincides with the longitudinal center axis 36 (this plane being indicated at 73c and 73c' in FIGS. 7 and 8, respectively, with this measurement line being perpendicular to a reference line which lies in a transverse plane and is tangent to the most adjacent surface location. Thus, with reference to FIG. 7, the distance W extends from the most adjacent surface location 52 to the longitudinal center axis 36 so as to be perpendicular to the longitudinal axis 36. In FIG. 8, the dimension "W" extends from the most adjacent surface location 58 to the axis location 62.

In FIG. 6 the surface width dimension W is shown as the dimension of the rear part of the main fuselage portion 24. Then there is an average surface width dimension of the intermediate section 40 of the rear fuselage portion 26. This average surface width dimension is taken by averaging the surface width dimension $W_1$ at the forward part of the intermediate section 40 and the surface width dimension $W_2$ at the rear end of the intermediate section 40.

With these various configuration parameters being described above, the relationships of these will now be discussed, with reference to FIG. 6.

The ratio of the overall length "L" of the rear fuselage portion 26 to the total surface width dimension of the aft portion of the main intermediate fuselage section 24 (L/2 W) is broadly between about one and four, with the desired range being between about two to three, and the value in a preferred configuration being 2.55. The ratio of the length ($L_1$) of the forward side surface region 44 to the total length "L" of the aft fuselage portion 26 (this ratio being expressed as $L_1/L$) is broadly between about 0.1 and 0.8, with the desired range being between about 0.2 to 0.6, and in the preferred configuration being 0.32. The ratio of the length ($L_2$) of the intermediate surface region 46 to the total (L) of the fuselage aft section 26 (expressed as $L_2/L$) is in the broad range between about 0.1 and 0.8, with the desired range being 0.2 to 0.6, and the preferred value being 0.26. The ratio of the length ($L_3$) of the rear surface region 48 to the total length of the fuselage rear portion 26 ($L_3/L$) is broadly between about 0.1 and 0.8, with the desired range between 0.2 and 0.6, and with a preferred value being 0.42. For practical reasons, it is desirable that the aft portion 26 of the fuselage 12 have its length within reasonable limits. Desirably, the ratio of the lengthwise dimension of the aft fuselage portion 26 to the total length of the fuselage would be between about 0.15 to 0.45, more desirably between about 0.2 to 0.4, and a preferred ratio being 0.31.

There is also a surface width dimension ratio. This is described as the ratio of the sum of the fore and aft surface width dimensions of the intermediate section 40 to double the value of the surface width dimension at the rear portion of the fuselage intermediate portion 24. The broad range of this ratio is from 0.4 to 0.9, with a preferred range being from 0.5 to 0.8, and with the preferred value in the configuration described herein being 0.63.

The preferred alignment angle ($\theta_1$) of the forward surface region 44 is broadly between about 5 degrees and 30 degrees, with a preferred range being between about 5 degrees and 20 degrees, and with a preferred value being about 12.6 degrees. The alignment angle ($\theta_2$) of the intermediate surface region 46 is broadly between about $-15$ degrees and $+15$ degrees, with a desired range being between about $-5$ degrees and $+5$ degrees, and with the preferred angle being 0 degrees. The alignment ($\theta_3$) of the rear surface region 48 is broadly between about 5 degrees and 30 degrees, with the preferred range being between 5 degrees and 20 degrees, and with the preferred value being 16.5 degrees.

Figure 9:
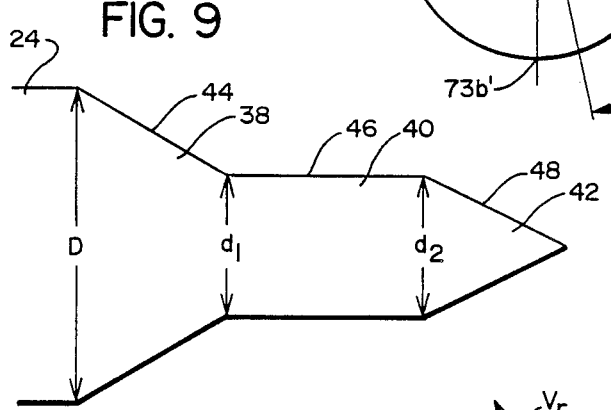
FIG. 9 is a somewhat schematic side elevational view of an idealized rear fuselage portion, to disclose certain configuration relationships.

To view the relationships of the sections 38–42 of the fuselage aft section 26 in another way, reference is made to FIG. 9, which illustrates a somewhat idealized configuration of the rear fuselage portion 26 where the area is presented as equivalent circles. Where the fuselage 12 was not of a circular cross sectional configuration, the diameter would be considered as being equal to the diameter of an equivalent circle. This can be simply calculated as follows:

$$D = \sqrt[2]{\frac{A}{\pi}}$$

where A is the area for which the equivalent circle is being calculated.

There is the forward diameter D which is at the rear end of the main fuselage section 24. The diameter $d_1$ is at the forward end of the intermediate section 40 of the rear fuselage portion 26 and the diameter $d_2$ is at the rear end of the intermediate section 40. The ratio of the diameter ($d_1$) of the forward portion of the intermediate section 40 to the diameter (D) at the rear end of the main fuselage portion 24 ($d_1/D$) is broadly between about 0.4 and 0.9, with a preferred range being between about 0.5 and 0.8, and with a preferred ratio being 0.63. The ratio of the diameter ($d_2$) to that of the diameter (D) at the rear end of the main fuselage portion 24 ($d_2/D$) is broadly between about 0.3 and 1, with a preferred range being 0.4 to 0.9, and the preferred ratio being 0.63. The ratio of the diameter ($d_1$) of the forward end of the intermediate section 46 to the diameter ($d_2$) at the rear end of the intermediate section 40 ($d_1/d_2$) would normally be between about 0.8 and 1.2.

Figure 10:
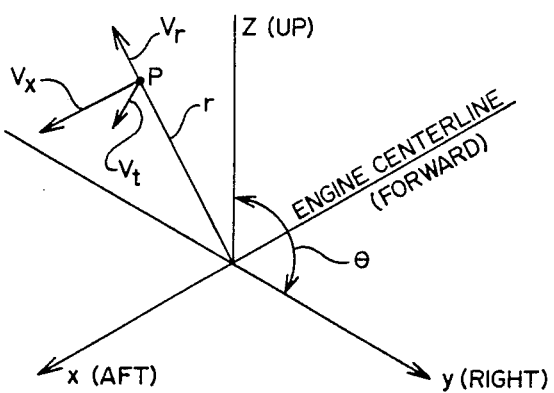
FIG. 10 is a schematic view illustrating the axes relative to a rotating propeller, and indicating the various velocity vector components of the propeller.
Figure 11A:
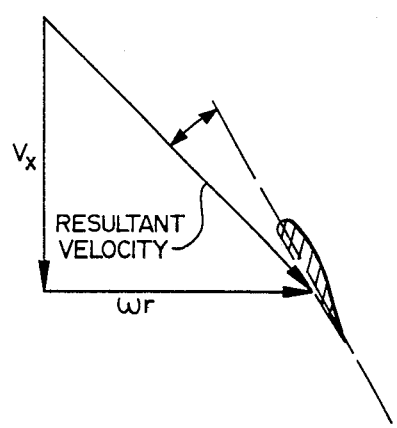
FIGS. 11a and 11b are diagrams which indicate the angle of attack of a propeller blade under conditions of varying tangential velocity components.

Another significant factor in the present invention is the air velocity vectors at various locations in the stream tube which passes through each propeller set 32. With reference made to FIG. 10, there is shown an "x" axis which is along the engine center line, a transverse horizontal axis "y" and a vertical axis "z". For purposes of analysis, it is desirable to use a cylindrical coordinate system. Any point P can be considered as being located a distance "r" from the engine center line at an angle "$\theta$" from the horizontal. The velocity at "P" can be defined by three vector components, namely:

$V_x$ = component in axial direction
$V_r$ = component in radial direction
$V_t$ = component in tangential direction The affect of the tangential velocity compoent $V_t$ will now be discussed with reference to FIGS. 11a and 11b. For purposes of discussion, we shall consider a point which is at the 75 percent radius location (i.e., located at a distance from the engine center line equal to 75 percent of the radius of the outermost propeller path. In FIG. 11a, there is no tangential velocity component, and the resultant velocity is determined by the axial velocity $V_x$ and the velocity component due to propeller rotation ($\omega r$). The resultant velocity is what the propeller "sees" and the pitch of the propeller is set to obtain the appropriate angle of attack.

Figure 11B:
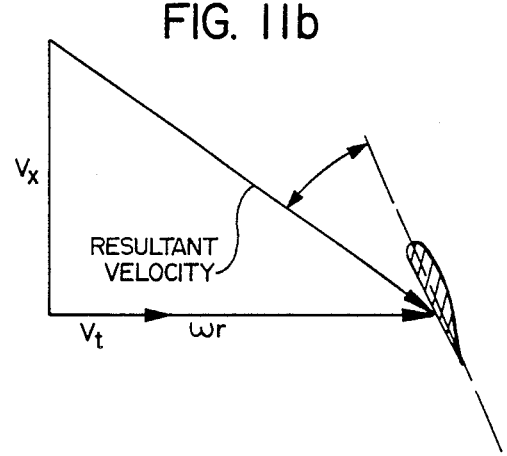

With reference to FIG. 11b, it can be seen that there has been added a tangential velocity component ($V_t$) which in this instance is added to the velocity component ($\omega r$) propeller rotation. It can be seen that this changes the angle of attack. On the other hand, the radial velocity component $V_r$ really has no affect on the angle of attack, since this velocity component flows parallel to the lengthwise axis of the propeller.

Figure 12:
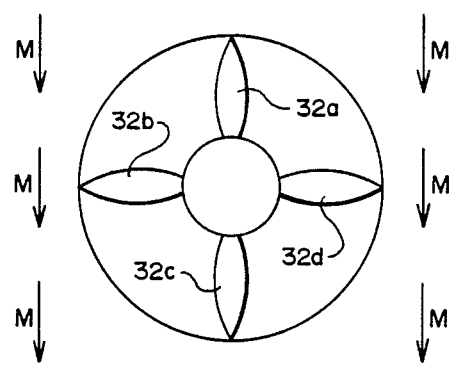
FIG. 12 is a schematic view showing a propeller blade in four different locations, to illustrate the effect of a uniform flow field on the tangential velocity component.

The tangential velocity component would not necessarily be detrimental, if it were constant over the entire propeller. However, this is normally not the case, and this will be explained with reference to FIG. 12. In FIG. 12 we are showing a propeller 32 at four different locations, namely, an upper location 32a, a lateral left location 32b, a downwardly directed location 32c, and a lateral and right direction 32d. Let us further assume that there is a uniform downward velocity component M, which would be a downdraft in the vicinity of the propeller. It can be seen that at the vertical propeller locations 32a and 32c, the velocity component contributed by the downward velocity M is simply a radial velocity component, and thus has no affect on the propeller angle of attack. However, when the propeller rotates (as shown in FIG. 12) in a counterclockwise direction to the location at 32b, the downward velocity component becomes a tangential velocity component which substracts from the rotational velocity component ($\omega r$), which is the product of the angular velocity times the radius) of the propeller. On the other hand, at the propeller location 32d, the affect of the velocity component M actually adds to the rotational velocity component ($\omega r$).

Figure 13:
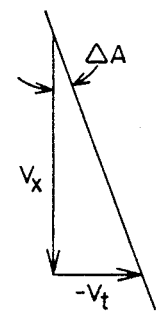
FIG. 13 is a diagrammatic view illustrating how ΔA is derived from the velocity components.
Figure 14:
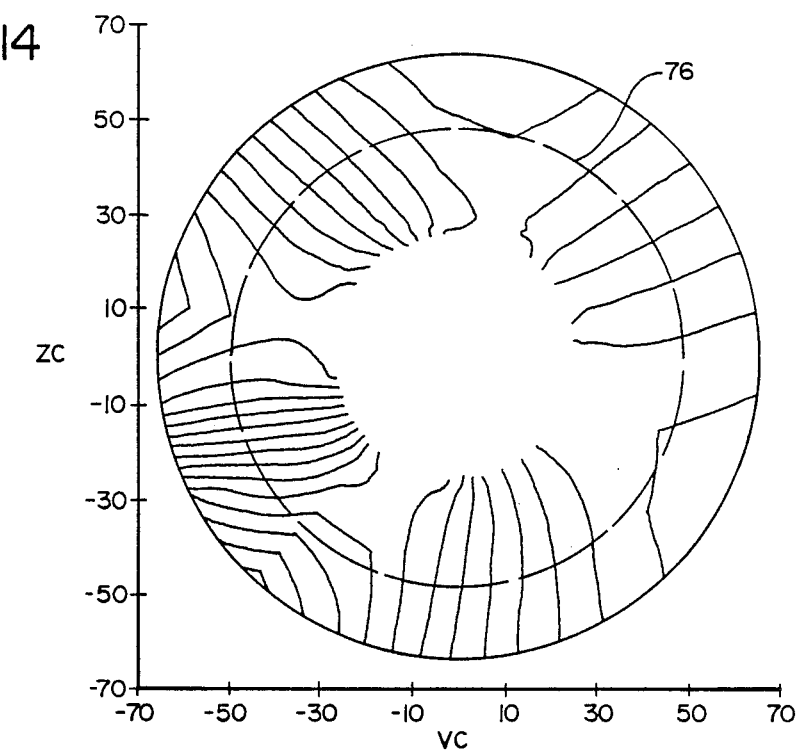
FIG. 14 is a representation of a stream tube at a propeller location, where there is a nacelle and strut, but no propeller, with the constant ΔA values being plotted, this being for an aft fuselage section of conventional configuration.
Figure 15:
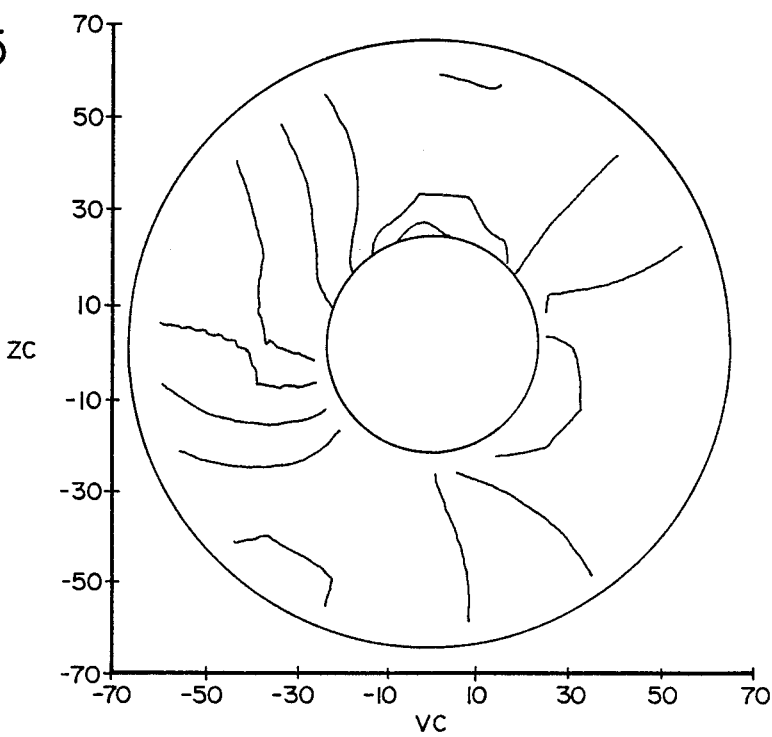
FIG. 15 is a view similar to FIG. 16, but illustrating the constant ΔA values in the propeller flow stream area in accordance with the present invention.

The effect of this is that a uniform downwash (M) causes a *nonuniform* variation in the tangential velocity component $V_t$. To place a value on the effect of the tangential velocity component, we can define an angle $\Delta A$ which is equal to the arc tangent of minus $V_t/V_x$, this being illustrated schematically in FIG. 13. With this angle $\Delta A$ defined, it is then possible to plot lines of constant $\Delta A$ to check the uniformity of the flow field passing into the area of the propeller. Reference is made to FIG. 14, which shows the flow field in the location of an engine nacelle which is mounted to the aft end of an airplane which is not contoured in accordance with the present invention, but is contoured in the manner of a normal fuselage (e.g., such as the Boeing 727) which closes in a more or less uniform curve toward the rear closure location. For purposes of illustration, there is drawn in FIG. 14 a propeller disk of a propeller which would be sized to be compatible with an airplane of that size and configuration, but the flow field is analyzed in the absence of a propeller. Thus, in FIG. 14 there is shown the various $\Delta A$ values in the flow field at the location where the propeller would be. For purposes of comparison, in FIG. 15 is shown a comparable flow field at the location of the propeller where the fuselage is contoured in accordance with the present invention, but with the propeller not being present. This contoured fuselage corresponds with the preferred values given for the various configuration parameters, as described previously herein. It can be seen that the $\Delta A$ values are dramatically decreased in the flow field produced with the present invention.

A comparison of the representations in FIGS. 14 and 15 illustrate the significant advantages obtained by the present invention. With the forward propeller 32 seeing a substantially uniform flow field, as in the present invention, the propeller blades can have a nearly optimized angle of attack throughout their entire 360 degree path of travel.

With a conventionally contoured fuselage (i.e., one which closes at the aft end with a reasonably uniform curve), it is of course possible to alleviate to some extent the effects of the curvature of the air flow by aligning the engines as much as possible to conform with the local flow field. However, the velocity flow components throughout the entire area of the stream tube flowing into the propeller are not uniform. For example, those portions of the stream tube which are quite close to the inwardly slanting surface of the aft portion of a conventional fuselage would be somewhat different from those velocity components at the laterally outermost portions of the stream tube and also different from the velocity components at the uppermost and lowermost locations in the propeller stream tube. With regard to the flow field illustrated in FIG. 14, this flow field is taken (as indicated previously) in the flow field surrounding a fuselage aft portion configured in generally the same manner as the Boeing 727 airplane. The angle of the plane along which the flow field was taken has an upward tilt of 1.89 degrees and "toes" moderately outwardly in a forward direction at about a 4.819 degree angle. In the present invention, there is also a moderate upward tilt and a "toe-out". The flow field illustrated in FIG. 15 (which is that illustrating the flow field achieved by the present invention) has an upward tilt of about 0.746 degrees and a "toe-out" of about 2.67 degrees. In addition to the flow field produced by the present invention being more uniform, it is also more aligned with the longitudinal center axis 36, in comparison with a more conventionally curved fuselage.

Figure 16:
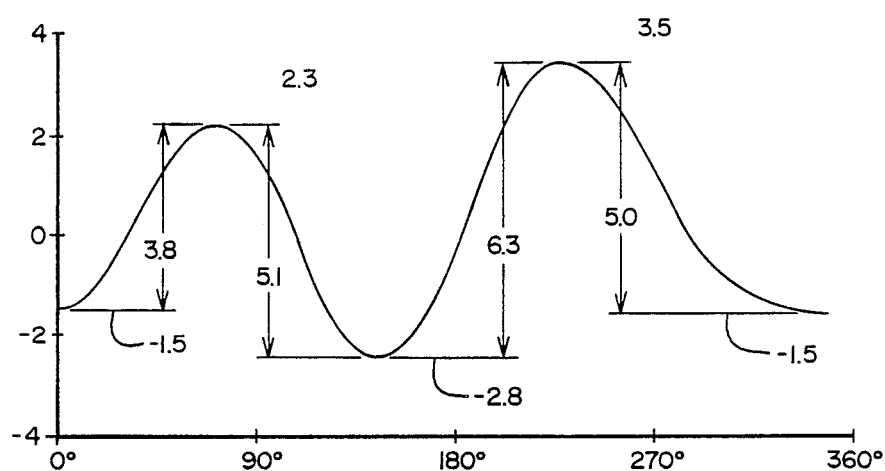
FIG. 16 is a plot to illustrate ΔA values at an "average" propeller location, with the propeller traveling 360 degrees.

The contour of the fuselage aft portion 26 of the present invention can also be defined in terms of the flow field it produces. To provide a value or standard for flow field uniformity, we shall first consider that there is an "average" blade section which is at 75 percent of blade span, as measured from the center of rotation of the propeller blade. This average propeller path is indicated at 76 in FIG. 14. We shall consider the propeller blade as being rotated 360 degrees through the flow field, and the ΔA versus $\theta$ is plotted at the 75 percent blade location. Such a plot is illustrated in FIG. 16. It can be seen that in this particular instance, the peak positive ΔA components are produced at approximately 70 degree and 220 degree locations of $\theta$, while peak negative values of ΔA are achieved close to the zero location and the 130 degree location.

To compare the uniformity of various flow fields, there is defined a "Uniformity Parameter" which is equal to the root sum square of the four absolute values of the peak to valley differences. Thus, in the graph of FIG. 16, it can be seen that there are four such values, namely 3.8, 5.1, 6.3 and 5.0. The "Uniformity Parameter" is calculated as follows:

$$U.P. = \sqrt{\frac{-3.8^{(2)} + 5.1^{(2)} + 6.3^{(2)} + 5^{(2)}}{4}} = 5.12$$

Figure 17:
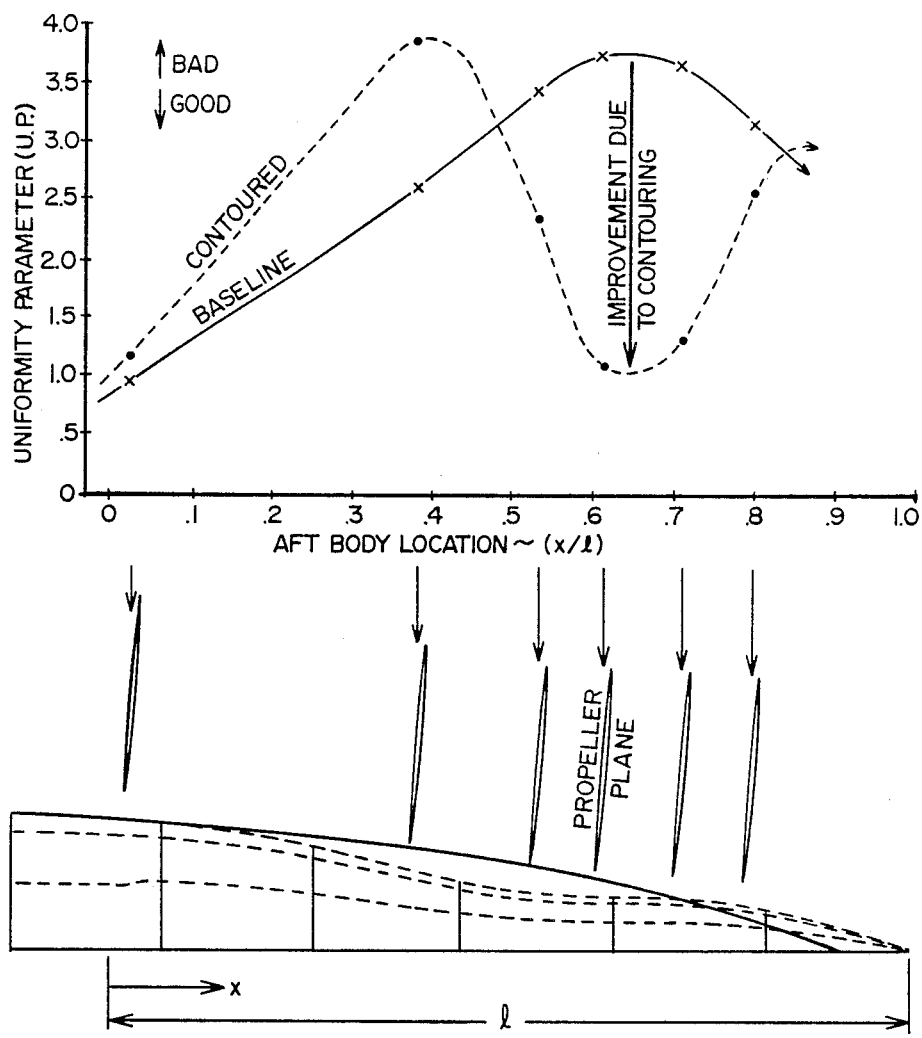
FIG. 17 is a graph representing Uniformity Parameters of flow fields achieved by a conventionally contoured aft fuselage section and also the aft fuselage section of the present invention.

To illustrate how the flow uniformity of the present invention is achieved, reference is now made to FIG. 17 which is a graph where the Uniformity Parameter (U.P.) is plotted for various locations along the length of the aft portion 26 of the fuselage. The broken line illustrates the Uniformity Parameter achieved by an optimized design of the present invention, while the solid line illustrates the Uniformity Parameter which is achieved with a conventionally contoured fuselage (e.g., such as in the Boeing 727 airplane). At the bottom of the graph, the contours of the aft surface regions of the present invention are given, and the contour of the conventional fuselage is also given. Also, the location of the planes along the propeller flow field are presented at locations where these values are derived. The flow fields which are being measured are those produced when there is no propeller, and also no engine nacelle nor strut.

It can be seen that in a conventionally curved aft fuselage portion, the Uniformity Parameter increases to a peak level a moderate distance rearwardly of the center station of the aft fuselage section, and then decreases. On the other hand, the Uniformity Parameter of the aft section of the fuselage contoured in accordance with the present invention rises to a peak value near the juncture location of the forward and intermediate surface regions 44 and 46, and then decreases sharply to reach a minimum level near the rear end of the intermediate surface region 46, and then climbs back up to a second peak value at the rear surface region 48. The Uniformity Parameter at the forward peak location would broadly be between 0 and 15, with the more probable limits between 2 and 5, and with the value being at about 3.8 in the preferred configuration of the present invention.

The rear Uniformity Parameter peak value is in the present invention broadly between 0 to 15, with the more probable or preferred limit being between about 2 and 5, and with the value in the preferred configuration of the present invention being at 3.0.

The minimum Uniformity Parameter value achieved in the present invention would broadly be between 0 and 5, with a more probable or preferred range being between 0 and 2, and with the value in the preferred configuration of the present invention being at 1.1.

It should be emphasized that in the present invention, the Uniformity Parameter at locations forwardly and rearwardly of the plane occupied by the propeller 32 are not of any great significance in and of themselves. Rather, the Uniformity Parameter achieved at the location of the propeller is of primary importance. However, the Uniformity Parameters at locations forwardly and rearwardly of the propeller are significant insofar as these flow fields are created in a manner that the overall flow field is such that the more uniform flow field can be achieved at the plane occupied by the propeller. Also, it should be recognized that the values produced for the graph of FIG. 17 are taken along a propeller stream tube having a constant cross sectional area and configuration, with the stream tube following the contour of the airflow forwardly and aft of the propeller location, with the propeller, nacelle and strut being absent.

The primary advantage achieved by the present invention is to enable the propellers 32 to be placed at a desired location, and yet create a more uniform flow field to optimize the operation of the propellers. However, there are other advantages which are achieved in the present invention. For example, it is possible to place the engines 26 somewhat closer to the fuselage center line than would ordinarily be possible. Structurally, this makes it easier to provide support for the engines. In addition, this enables the aircraft to be trimmed more easily in yaw.

An additional advantage is that in the configuration of the present invention, it is possible to reduce aerodynamic interference between the nacelle and the fuselage. Further, it is possible to some extent to reduce the velocity of the airflow in the vicinity of the propellers, thus enhancing propeller efficiency.

Also, it is to be understood that while the present invention has been described with reference to a prop engine, within the broader scope of the present invention, at least some of the teachings of the present invention may also be applicable to a fan jet engine, where the fan is the propeller, or possibly to some engine where a uniform flow field to the engine is critical.

Figure 18:
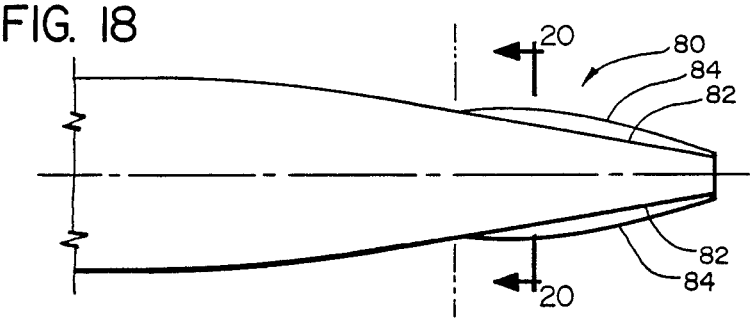
FIG. 18 is a top plan view showing somewhat schematically how an aft body section of a conventional aircraft fuselage can be modified to incorporate the teachings of the present invention.
Figure 19:
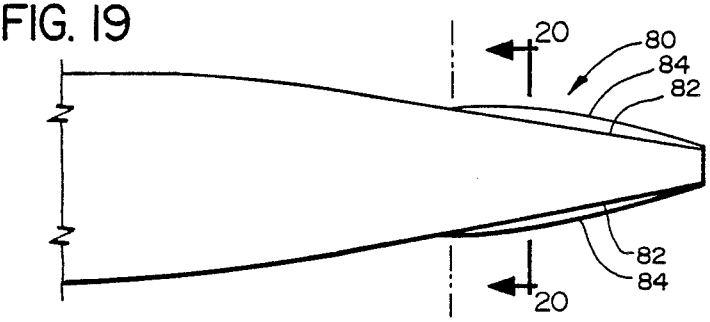
FIG. 19 is a side elevational view of the aft fuselage portion shown in FIG. 18.
Figure 20:
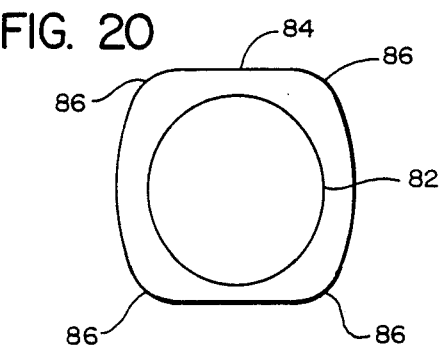
FIG. 20 is a sectional view taken along line 20—20 of FIGS. 18 and 19, showing both the prior art configuration and the modified configuration in accordance with the present invention.

It should also be recognized that the configuration of the fuselage aft section need not be such that the cross sectional areas are circular. For example, with reference to FIGS. 18 through 20, there is shown how the present invention might be adapted as a retrofit to the aft end of a fuselage which previously had a conventional configuration. There is shown an aft body section 80 where the conventional contour is shown at 82, and the contour of the added fuselage portion is shown at 84. It can be seen that the "corners" 86 in the cross sectional configuration are to some extent "squared off" so that the overall cross sectional configuration is similar to a square configuration with the corners of the square being rounded to some extent, and the middle portion of the side surface protruding outwardly to a moderate extent. One reason for "squaring" the cross sectional configuration of the aft fuselage portion is that if the end closure location is to be placed at a location not too far rearwardly, it may be desirable to move the side surfaces of the aft portion of the fuselage inwardly somewhat. However, to keep the total cross sectional area within the appropriate limits to obtain the desired ends of the present invention, it may be desirable to "fill in the corners" of the cross section as shown in FIG. 20.

It is to be understood that various modifications could be made to the present invention without departing from the basic teachings thereof.

What is claimed is:

1. An aircraft comprising:
   (a) a fuselage having a longitudinal center axis, a forward portion, an intermediate main portion, and a rear portion, said rear portion comprising a forward section, a rear section with an end closure location, and an intermediate section,
   (b) first and second engines mounted adjacent to an exterior surface of said rear section, said engines having first and second enclosed propeller means at first and second propeller locations, said propeller means being arranged to rotate about first and second propeller axes, respectively, with each propeller axis having a substantial alignment component parallel to said longitudinal axis,
   (c) the rear portion of the fuselage having first and second exterior, longitudinally extending surface portions, said first surface portion having a first forward surface region extending longitudinally along said forward section, a first intermediate surface region extending along said intermediate section adjacent to said first propeller means, and a first rear surface region extending along said rear section, said second surface portion having a second forward surface region extending longitudinally along said forward section, a second intermediate surface region extending along said intermediate section adjacent to said second propeller means, and a second rear surface region extending along said rear section,
   (d) said rear fuselage portion being characterized in that the forward region of each surface portion slants rearwardly and inwardly toward said longitudinal center axis at a relatively greater inward and rearward slant relative to said longitudinal axis and curves concavely to join to its related intermediate region which has less inward and rearward slant with respect to said longitudinal center axis relative to its related forward surface region, each intermediate region joining to its related rear region in a convex curve with each rear region slanting rearwardly and inwardly to said closure location.

2. The aircraft as recited in claim 1, wherein said first and second longitudinally extending surface portions each have a generally longitudinally extending surface center line, each having forward, intermediate and rear center line portions, each forward center line portion being slanted forwardly and outwardly at a forward angle which is between about 5 and 30 degrees, each of said intermediate center line portions being angled in a forward direction at an intermediate angle between −15 degrees and +15 degrees, where a minus angle slants forwardly and toward said longitudinal axis and a positive angle slants forwardly and away from said longitudinal axis, each of said rear surface center line portions slanting forwardly and outwardly at a rear angle of between 5 and 30 degrees.

3. The aircraft as recited in claim 2, wherein said forward angles are between 5 and 20 degrees, said intermediate angles are between about −5 and +5 degrees, and said rear angles are each between about 5 degrees and 20 degrees.

4. The aircraft as recited in claim 3, wherein each of said forward angles is between about 12 to 13 degrees, each of said intermediate angles is about 0 degrees, and each of said rear angles is between about 16 and 17 degrees.

5. The aircraft as recited in claim 1, wherein said rear fuselage portion has an overall length dimension, said forward section has a forward length dimension, said rear section has a rear length dimension, and said intermediate section has an intermediate length dimension, said aircraft having a forward length dimension ratio which is the ratio of the forward length dimension to the overall length dimension and which is between about 0.1 and 0.8, an intermediate length ratio which is the ratio between the intermediate length and the overall length and which is between about 0.1 and 0.8, and a rear lengthwise dimension ratio which is the ratio of the rear length dimension to the overall length dimension being between about 0.1 and 0.8.

6. The aircraft as recited in claim 5, wherein the forward length ratio dimension is between about 0.2 and 0.6, the intermediate length ratio dimension is between about 0.2 and 0.6, and the rear length dimension is between about 0.2 and 0.6.

7. The aircraft as recited in claim 6, wherein the forward dimension ratio is between about 0.27 and 0.37, the intermediate length dimension ratio is between about 0.23 and 0.3, and the rear length dimension ratio is between about 0.4 and 0.45.

8. The aircraft as recited in claim 1, wherein the rear portion of the fuselage has an overall lengthwise dimension, and said fuselage has a surface width dimension which is equal to a distance measured from a point on a center line of one of said surface portions along a transverse line generally perpendicular to a transverse tangent line at said point on the center line to a vertical longitudinal center plane along said fuselage, said intermediate portion of the fuselage having at a rear portion thereof a total surface width dimension which is twice the surface width dimension at the location of the rear portion of the intermediate fuselage portion, said aircraft having a length to surface width ratio which is the ratio of the overall lengthwise dimension to the total surface width dimension and which is between about 1 and 4.

9. The aircraft as recited in claim 8, wherein the length to surface width ratio is between about 2 to 3.

10. The aircraft as recited in claim 9, wherein the length to surface width ratio is between about 2.5 and 2.6.

11. The aircraft as recited in claim 1, wherein there is a surface width dimension ratio, the surface width dimension being defined as a distance measured from a point on a center line of one of said surface portions along a transverse line generally perpendicular to a transverse tangent line at said point on the center line to a vertical longitudinal center plane along said fuselage, said ratio being equal to the ratio of a value equal to the sum of the surface width dimension at a forward end of the intermediate surface region and a surface width dimension at a rear end of the intermediate surface region, to a value equal to twice the surface width dimension at a rear end portion of the intermediate fuselage portion, said surface width dimension ratio being between about 0.4 to 0.9.

12. The aircraft as recited in claim 11, wherein the surface width dimension ratio is between about 0.5 to 0.8.

13. The aircraft as recited in claim 12, wherein the surface width dimension ratio is between about 0.6 and 0.65.

14. The aircraft as recited in claim 1, wherein said fuselage has a diameter dimension of an equivalent circle of a cross sectional area of said fuselage, and there is a first diameter dimension ratio which is equal to a ratio of the diameter dimension at a forward end of said intermediate section to a diameter dimension at a rear end portion of the intermediate fuselage portion, said first diameter dimension ratio being between about 0.4 and 0.9, said aircraft having a second diameter dimension ratio which is equal to a ratio between the diameter dimension at a rear end of said intermediate section to the diameter dimension at a rear end portion of the intermediate portion of the fuselage, said second diameter dimension ratio between about 0.3 and 1.

15. The aircraft as recited in claim 14, wherein said first diameter dimension ratio is between about 0.5 and 0.8, and said second diameter dimension ratio is between about 0.4 and 0.9.

16. The aircraft as recited in claim 15, wherein each of said first and second diameter dimension ratios is between about 0.6 and 0.65.

17. The aircraft as recited in claim 1, wherein said fuselage has a diameter dimension of an equivalent circle of a cross sectional area of said fuselage, said intermediate section of the rear fuselage portion having a relative diameter dimension ratio, which is equal to a ratio between a diameter dimension at a forward end of said intermediate section and a diameter dimension at a rear end of said intermediate section, said intermediate diameter dimension ratio being between about 0.8 and 1.2.

18. The aircraft as recited in claim 17, wherein said intermediate diameter dimension ratio is approximately 1.

19. The aircraft as recited in claim 1, wherein said fuselage has associated propeller flow fields extending forwardly and rearwardly from propeller locations of said propeller means, with said propeller flow fields being characterized in having Uniformity Parameters along said flow fields under circumstances where said propeller means are absent from said propeller locations, said fuselage rear portion being characterized in that said fuselage affects said propeller flow fields in a manner that the Uniformity Parameters vary in a rearward direction along said propeller flow fields in that there are first Uniformity Parameters of a first higher Uniformity Parameter value forward of said propeller locations, then second Uniformity Parameters at said propeller locations of lower Uniformity Parameter values in comparison with said first Uniformity Parameter values, and then third Uniformity Parameter values at locations rearwardly of said propeller locations of third higher Uniformity Parameter values in comparison with said second Uniformity Parameter values.

20. The aircraft as recited in claim 19, wherein each of said first Uniformity Parameter values is between about 0 and 15, each of said third Uniformity Parameter values is between about 0 and 15, and said second Uniformity Parameter values are between about 0 and 5.

21. The aircraft as recited in claim 20, wherein said first Uniformity Parameter values are between about 2 and 5, said third Uniformity Parameter values are between about 2 and 5, and said second Uniformity Parameter values are between about 0 and 2.

22. The aircraft as recited in claim 21, wherein said first Uniformity Parameter values are between about 3.5 and 4.5, said third Uniformity Parameter values are between about 2.5 and 3.5, and said second Uniformity Parameter values are between about 0 and 1.5.

23. The aircraft as recited in claim 1, wherein said fuselage has a total fuselage length, and said rear fuselage portion has a rear fuselage length, with a ratio of said rear fuselage length to said total fuselage length being between about 0.15 and 0.45.

24. The aircraft as recited in claim 23, wherein said ratio of the rear fuselage length to the total fuselage length is between about 0.2 and 0.4.

25. The aircraft as recited in claim 24, wherein the ratio of said rear fuselage length to said total fuselage length is between about 0.27 and 0.35.

26. The aircraft as recited in claim 1, wherein:
(a) said first and second longitudinally extending surface portions each having a generally longitudinally extending surface center line, each having forward, intermediate and rear center line portions, each forward center line portion being slanted forwardly and outwardly at a forward angle which is between about 5 and 30 degrees, each of said intermediate center line portions being angled in a forward direction at an intermediate angle between −15 degrees and +15 degrees, where a minus angle slants forwardly and toward said longitudinal axis and a positive angle slants forwardly and away from said longitudinal axis, each of said rear surface center line portions slanting forwardly and outwardly at a rear angle of between 5 and 30 degrees,
(b) said rear fuselage portion has an overall length dimension, said forward section has a forward length dimension, said rear section has a rear length dimension, and said intermediate section has an intermediate length dimension, said aircraft having a forward length dimension ratio which is the ratio of the forward length dimension to the overall length dimension and which is between about 0.1 and 0.8, an intermediate length ratio which is the ratio between the intermediate length and the overall length and which is between about 0.1 and 0.8, and a rear lengthwise dimension ratio which is the ratio of the rear length dimension to the overall length dimension being between about 0.1 and 0.8,
(c) said fuselage has a surface width dimension which is equal to a distance measured from a point on a center line of one of said surface portions along a transverse line generally perpendicular to a transverse tangent line at said point on the center line to a vertical longitudinal center plane along said fuselage, said intermediate portion of the fuselage having at a rear portion thereof a total surface width dimension which is twice the surface width dimension at the location of the rear portion of the intermediate fuselage portion, said aircraft having a length to surface width ratio which is the ratio of the overall lengthwise dimension to the total surface width dimension and which is between about 1 and 4, and (d) there is a surface width dimension ratio, said ratio being equal to the ratio of a value equal to the sum of the surface width dimension at a forward end of the intermediate surface region and a surface width dimension at the a rear end of the intermediate surface region, to a value equal to twice the surface width dimension at a rear end portion of the intermediate fuselage portion, said surface width dimension ratio being between about 0.4 to 0.9.

27. The aircraft as recited in claim 26, wherein:

(a) said forward angles are between 5 and 20 degrees, said intermediate angles are between about −5 and +5 degrees, and said rear angles are each between about 5 degrees and 20 degrees, (b) the forward length ratio dimension is between about 0.2 and 0.6, the intermediate length ratio dimension is between about 0.2 and 0.6, and the rear length dimension is between about 0.2 and 0.6, (c) the length to surface width ratio is between about 2 to 3, and (d) the surface width dimension ratio is between about 0.5 to 0.8.

28. The aircraft as recited in claim 27, wherein:

(a) each of said forward angles is between about 12 to 13 degrees, each of said intermediate angles is about 0 degrees, and each of said rear angles is between about 16 and 17 degrees, (b) the forward dimension ratio is between about 0.27 and 0.37, the intermediate length dimension ratio is between about 0.23 and 0.3, and the rear length dimension ratio is between about 0.4 and 0.45, (c) the surface width ratio is between about 2.5 and 2.6, and (d) the surface width dimension ratio is between about 0.6 and 0.65.

29. The aircraft as recited in claim 1, wherein:

(a) said rear fuselage portion has an overall length dimension, said forward section has a forward length dimension, said rear section has a rear length dimension, and said intermediate section has an intermediate length dimension, said aircraft having a forward length dimension ratio which is the ratio of the forward length dimension to the overall length dimension and which is between about 0.1 and 0.8, an intermediate length ratio which is the ratio between the intermediate length and the overall length and which is between about 0.1 and 0.8, and a rear lengthwise dimension ratio which is the ratio of the rear length dimension to the overall length dimension being between about 0.1 and 0.8, and (b) said fuselage has a diameter dimension of an equivalent circle of a cross sectional area of said fuselage, and there is a first diameter dimension ratio which is equal to a ratio of the diameter dimension at a forward end of said intermediate section to a diameter dimension at a rear end portion of the intermediate fuselage portion, said first diameter dimension ratio being between about 0.4 and 0.9, said aircraft having a second diameter dimension ratio which is equal to a ratio between the diameter dimension at a rear end of said intermediate section to the diameter dimension at a rear end portion of the intermediate portion of the fuselage, said second diameter dimension ratio between about 0.3 and 1.

30. The aircraft as recited in claim 29, wherein:

(a) the forward length ratio dimension is between about 0.2 and 0.6, the intermediate length ratio dimension is between about 0.2 and 0.6, and the rear length dimension is between about 0.2 and 0.6, and (b) said first diameter dimension ratio is between about 0.5 and 0.8, and said second diameter dimension ratio is between about 0.4 and 0.9.

31. The aircraft as recited in claim 30, wherein:

(a) the forward dimension ratio is between about 0.27 and 0.37, the intermediate length dimension ratio is between about 0.23 and 0.3, and the rear length dimension ratio is between about 0.4 and 0.45, and (b) each of said first and second diameter dimension ratios is between about 0.6 and 0.65.

32. The aircraft as recited in claim 29, wherein the intermediate section of the rear fuselage portion has a relative diameter dimension ratio which is equal to a ratio between a diameter dimension at a forward end of said intermediate section and a diameter dimension at a rear end of said intermediate section, said intermediate diameter dimension ratio being between about 0.8 and 1.2.

33. The aircraft as recited in claim 32, wherein said intermediate diameter dimension ratio is approximately 1.

34. The aircraft as recited in claim 1, wherein:

(a) said fuselage has associated propeller flow fields extending forwardly and rearwardly from propeller locations of said propeller means, with said propeller flow fields being characterized in having Uniformity Parameters along said flow fields under circumstances where said propeller means are absent from said propeller locations, said fuselage rear portion being characterized in that said fuselage affects said propeller flow fields in a manner that the Uniformity Parameters vary in a rearward direction along said propeller flow fields in that there are first Uniformity Parameters of a first higher Uniformity Parameter value forward of said propeller locations, then second Uniformity Parameters at said propeller locations of lower Uniformity Parameter values in comparison with said first Uniformity Parameter values, and then third Uniformity Parameter values at locations rearwardly of said propeller locations of third higher Uniformity Parameter values in comparison with said second Uniformity Parameter values, and (b) said fuselage has a total fuselage length, and said rear fuselage portion has a rear fuselage length, with a ratio of said rear fuselage length to said total fuselage length being between about 0.15 and 0.45.

35. The aircraft as recited in claim 34, wherein:

(a) each of said first Uniformity Parameter values is between about 0 and 15, each of said third Uniformity Parameter values is between about 0 and 15, and said second Uniformity Parameter values are between about 0 and 5, and (b) said ratio of the rear fuselage length to the total fuselage length is between about 0.2 and 0.4.

36. The aircraft as recited in claim 35, wherein:

(a) said first Uniformity Parameter values are between about 2 and 5, said third Uniformity Parameter values are between about 2 and 5, and said second Uniformity Parameter values are between about 0 and 2, and (b) the ratio of said rear fuselage length to said total fuselage length is between about 0.27 and 0.35.

37. The aircraft as recited in claim 36, wherein said first Uniformity Parameter values are between about 3.5 and 4.5, said third Uniformity Parameter values are between about 2.5 and 3.5, and said second Uniformity Parameter values are between about 0 and 1.5.

38. A body and engine combination comprising
(a) a body having a longitudinal center axis, a forward section, a rear section with an end closure location, and an intermediate section,
(b) an engine mounted adjacent to an exterior surface of said body, said engine having a unenclosed propeller means at a propeller location, said propeller means being arranged to rotate about a propeller axis which has a substantial alignment component parallel to said longitudinal axis,
(c) said body having an exterior, longitudinally extending surface portion, said surface portion having a forward surface region extending longitudinally along said forward section, an intermediate surface region extending along said intermediate section adjacent to said propeller means, and a rear surface region extending along said rear section,
(d) said body being characterized in that the forward region slants rearwardly and inwardly toward said longitudinal center axis at a relatively greater inward and rearward slant relative to said longitudinal axis and curves concavely to join to said intermediate region which has less inward and rearward slant with respect to said longitudinal center axis relative to the related forward surface region, the intermediate region joining to said related rear region in a convex curve with the rear region slanting rearwardly and inwardly to said closure location.

39. The combination as recited in claim 38, wherein said longitudinally extending surface portion has a generally longitudinally extending surface center line, having forward, intermediate and rear center line portions, said forward center line portion being slanted forwardly and outwardly at a forward angle which is between about 5 and 30 degrees, said intermediate center line portion being angled in a forward direction at an intermediate angle between −15 degrees and +15 degrees, where a minus angle slants forwardly and toward said longitudinal axis and a positive angle slants forwardly and away from said longitudinal axis, said rear surface center line portion slanting forwardly and outwardly at a rear angle of between 5 and 30 degrees.

40. The combination as recited in claim 39, wherein said forward angle is between 5 and 20 degrees, said intermediate angle is between about −5 and +5 degrees, and said rear angle is between about 5 degrees and 20 degrees.

41. The combination as recited in claim 40, wherein said forward angle is between about 12 to 13 degrees, each of said intermediate angle is about 0 degrees, and each of said rear angle is between about 16 and 17 degrees.

* * * * *